United States Patent

Adams

[11] 3,873,131
[45] Mar. 25, 1975

[54] TRAILER SAFETY HITCH
[75] Inventor: William N. Adams, Silsbee, Tex.
[73] Assignee: The Raymond Lee Organization, Inc., New York, N.Y. ; a part interest
[22] Filed: July 17, 1973
[21] Appl. No.: 380,074

[52] U.S. Cl............................ 280/456 R, 280/457
[51] Int. Cl........................... B60d 1/06, B60d 1/12
[58] Field of Search............ 280/457, 446 R, 446 B, 280/456 R, 482

[56] References Cited
UNITED STATES PATENTS
3,471,170 10/1969 Rendessy....................... 280/457 X
3,724,875 4/1973 Hillman............................. 280/457

Primary Examiner—Stanley H. Tollberg
Assistant Examiner—John P. Shannon
Attorney, Agent, or Firm—Howard I. Podell

[57] ABSTRACT

A trailer hitch safety device consisting of a flexible steel cable unit which is attached to the hitch in such a manner that tension in the cable may be applied by means of a rachet-type mechanism to prevent the hitch from becoming disengaged between the towing and towed vehicle even if the normal locking device of the hitch fails.

2 Claims, 2 Drawing Figures

PATENTED MAR 25 1975　　　　　　　　　　　　　　3,873,131

TRAILER SAFETY HITCH

SUMMARY OF THE INVENTION

This invention relates to a trailer safety hitch and particularly to one in which the hitch is held together, even when the normal locking devices fail, by the action of a steel cable mounted on an inclined pulley mounted on the hitch so as to join both towing and towed vehicles.

An advantage of this invention is that tension force of the cable device holds the two parts of the hitch in contact and prevents disengagement of the hitch, even when turning a corner.

A further advantage of this invention is that the tension force in the cable device can be applied or released easily by one person using a rachet-type mechanism.

The device consists of a length of steel cable of suitable size with snap hooks or eyes in each end, mounted about a pulley fastened on an inclined rachet-type device on the tongue of the trailer hitch. The eyes at each end of the cable can be snapped into a suitable fitting on the automobile end of the hitch. By action of the rachet unit, tension may be applied to the cable to draw the two parts of the hitch tightly together.

BRIEF DESCRIPTION OF THE DRAWINGS

The objects and features of the invention may be understood with reference to the following detailed description of an illustrative embodiment of the invention, taken together with the accompanying drawings in which.

DESCRIPTION OF THE PREFERRED EMBODIMENT

Figure 1:
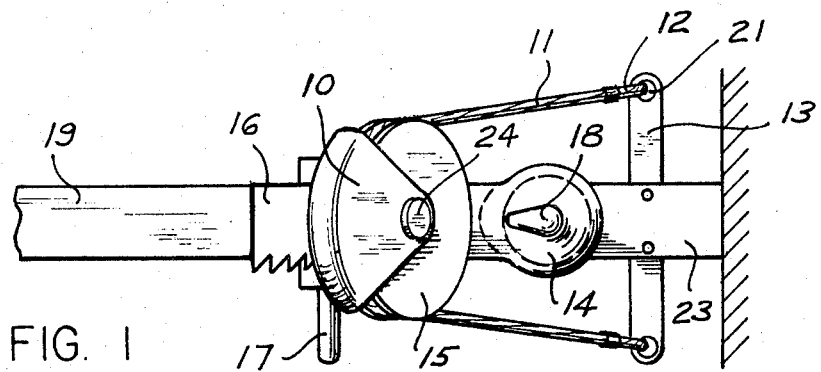
FIG. 1. is a plan view of the device in use.
Figure 2:
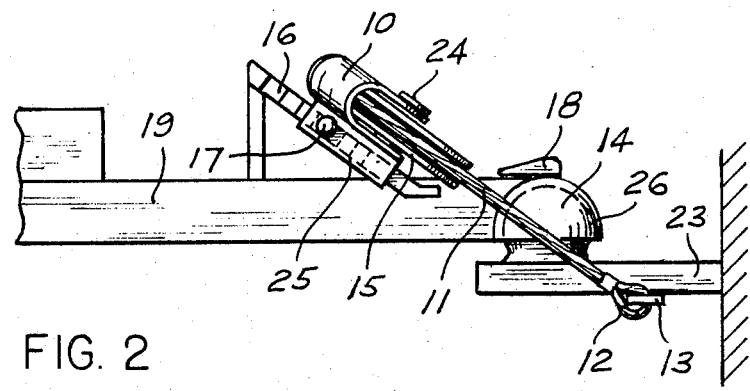
FIG. 2 is an elevation view of the device in use.

Turning now descriptively to the drawings, in which similar reference characters denote similar elements throughout the several views, FIG. 1 illustrates the device 10 in use with the cable 11 attached to holes 21 in cross-bar 13 of the automobile hitch bar 23 by means of snap hooks 12 at the cable ends. The cable 11 passes around the pulley 15 which is freely rotatably mounted on pivot pin 24. Pivot Pin 24 is fastened to a slide member 25 which rides on inclined rachet 16 fastened at a vertical angle to the horizontal trailer hitch bar 19. The pivot pin 24 and pulley 15 is moved up the rachet 16, thus applying tension to the cable 11, by the user reciprocating rachet handle 17, with the rachet mechanism being of the conventional design of similar rachet automobile jacks. This cable tension tends to hold the tongue 26 of the trailer hitch bar 19 and the automobile hitch bar 23 together at the ball 14 whether or not the normal trailer hitch lock 18 is functioning. FIG. 2 shows the detail of the side elevation view of the device 10 in use with the tension of cable 11 providing an upward pull on the automobile hitch bar 23 and attached ball 14 thus preventing the hitch from separating.

The tension force in cable 11 remains at a constant value while the attached vehicles go about a curve, since the cable 11 may freely pass about rotatable pulley 15 in response to angular variation of automobile hitch bar 23 with trailer hitch bar 19.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by letters patent of the United States is:

1. A trailer hitch for joining the hitch bar of a towing vehicle to the hitch bar of the towed vehicle, consisting of a cross bar mounted at a point of attachment to a first hitch bar and oriented perpendicularly to the axis of the said hitch bar, with a cable mounted over a free rotatable pulley, said pulley being mounted on the other second hitch bar, and said cable fitted with means to fasten a first end of the said cable to the cross bar at a fixed distance from the point of attachment of the cross bar to the first hitch bar, with means to fasten the other second end of the cable to the other side of the cross bar at an equal said fixed distance from the point of attachment of the cross bar to the first hitch bar, together with means to apply a tension force to the cable when the two hitch bars are joined together in the conventional fashion, in which the pulley is rotatably mounted in a frame, with said frame fastened onto a rachet bar that fastens to the second hitch bar, with means associated with a handle for moving the said frame in a direction on the rachet bar so as to increase the tension in the cable, with said rachet bar mechanism holding the said frame in a fixed position after the desired tension force has been reached in the cable.

2. The combination as recited in claim 1 in which the rachet bar is mounted at a vertical angle to the hitch bar on which it is fastened, so that the applied tension force of the cable when fastened to the cross bar of the other hitch bar creates a vertical force vector and a horizontal force vector to join both fastened hitch bars together.

* * * * *